(12) United States Patent
Linstadt

(10) Patent No.: US 9,698,935 B2
(45) Date of Patent: Jul. 4, 2017

(54) VARIABLE CODE RATE TRANSMISSION

(75) Inventor: John Eric Linstadt, Palo Alto, CA (US)

(73) Assignee: Rambus Inc., Sunnyvale, CA (US)

( * ) Notice: Subject to any disclaimer, the term of this patent is extended or adjusted under 35 U.S.C. 154(b) by 124 days.

(21) Appl. No.: 14/238,401

(22) PCT Filed: Aug. 9, 2012

(86) PCT No.: PCT/US2012/050205
§ 371 (c)(1),
(2), (4) Date: Feb. 11, 2014

(87) PCT Pub. No.: WO2013/032663
PCT Pub. Date: Mar. 7, 2013

(65) Prior Publication Data
US 2014/0208188 A1    Jul. 24, 2014

Related U.S. Application Data

(60) Provisional application No. 61/530,379, filed on Sep. 1, 2011.

(51) Int. Cl.
*H04L 1/00* (2006.01)
*G06F 11/10* (2006.01)

(52) U.S. Cl.
CPC ............ *H04L 1/0009* (2013.01); *G06F 11/10* (2013.01); *G06F 11/1008* (2013.01)

(58) Field of Classification Search
CPC .............................. H04L 1/0017; H04L 1/009
See application file for complete search history.

(56) References Cited

U.S. PATENT DOCUMENTS

| | | | |
|---|---|---|---|
| 5,657,325 A | 8/1997 | Lou et al. | |
| 6,012,839 A * | 1/2000 | Nguyen et al. | 714/755 |
| 6,182,264 B1 * | 1/2001 | Ott | 714/774 |
| 6,697,992 B2 | 2/2004 | Ito et al. | |
| 7,210,077 B2 * | 4/2007 | Brandenberger et al. | 714/708 |
| 7,650,558 B2 | 1/2010 | Rosenbluth et al. | |
| 7,894,289 B2 | 2/2011 | Pawlowski | |
| 8,122,323 B2 * | 2/2012 | Leung et al. | 714/774 |

(Continued)

OTHER PUBLICATIONS

Kumar, A.; Qin, H.; Ishwar, P.; Rabaey, J.; Ramchandran, K., "Fundamental Bounds on Power Reduction during Data-Retention in Standby SRAM," Circuits and Systems, 2007. ISCAS 2007. IEEE International Symposium on , vol., no., pp. 1867,1870, May 27-30, 2007.*

(Continued)

*Primary Examiner* — Steve Nguyen
(74) *Attorney, Agent, or Firm* — The Neudeck Law Firm, LLC

(57) ABSTRACT

An integrated circuit device includes an output buffer circuit that provides a first output having a first code rate. The first output is provided in response to a first indication of a change in a parameter that affects an error rate of the first output. The first output includes redundant information. The output buffer circuit provides a second output having a second code rate. The second output is provided in response to a second indication of the second output having an error rate that is different than the error rate of the first output. The second code rate of the second output is different than the first code rate.

20 Claims, 8 Drawing Sheets

(56) References Cited

U.S. PATENT DOCUMENTS

| | | |
|---|---|---|
| 8,429,492 B2* | 4/2013 | Yoon et al. .................... 714/763 |
| 8,560,931 B2* | 10/2013 | Seshadri et al. .............. 714/801 |
| 8,572,423 B1* | 10/2013 | Isachar et al. ................ 713/340 |
| 2002/0172292 A1 | 11/2002 | Gray |
| 2003/0072283 A1 | 4/2003 | Varshney et al. |
| 2007/0038907 A1* | 2/2007 | Jeddeloh et al. ............. 714/718 |
| 2009/0070651 A1* | 3/2009 | Diggs ................. G06F 11/1068 |
| | | 714/752 |
| 2009/0327833 A1 | 12/2009 | Suto |
| 2010/0241928 A1* | 9/2010 | Kim et al. .................... 714/763 |
| 2011/0252289 A1* | 10/2011 | Patapoutian et al. ......... 714/763 |
| 2014/0047306 A1 | 2/2014 | Perego |

OTHER PUBLICATIONS

Huifang Qin; Kumar, A.; Ramchandran, K.; Rabaey, J.; Ishwar, P., "Error-Tolerant SRAM Design for Ultra-Low Power Standby Operation," Quality Electronic Design, 2008. ISQED 2008. 9th International Symposium on , vol., no., pp. 30,34, Mar. 17-19, 2008.*

* cited by examiner

VARIABLE CODE RATE TRANSMISSION

CROSS REFERENCE TO RELATED APPLICATION

This patent application claims the benefit of U.S. provisional patent application 61/530,379, filed Sep. 1, 2011, which is incorporated by reference herein in its entirety.

TECHNICAL FIELD

The present disclosure relates to electronic circuits, and more particularly, to techniques for exchanging information between integrated circuit devices.

DETAILED DESCRIPTION

Error-tolerant communication of information between integrated circuits in a system is disclosed in various embodiments. In a number of embodiments, for example, the system generates encoded information by encoding read data, write data, commands, and/or addresses using an error detection and/or error correction code. The encoded information includes redundant information. The redundant information is used to detect and/or correct errors in the encoded information. The encoded information is provided after a change occurs (e.g., a transient event) that affects an error rate of bits indicated by signals transmitted between a controller integrated circuit (IC) and a memory integrated circuit (IC) in the system. For example, the change may be a change in a supply voltage provided to the memory or controller IC, a change in a temperature of the memory or controller IC, or a change in a duty cycle or frequency of a clock signal provided to the memory IC or utilized within the controller IC.

The receiving integrated circuit decodes the encoded information to recover the read data, write data, commands, and/or addresses. In some embodiments, the code rates of the signals transmitted between the controller and the memory integrated circuits are increased after the error rate of bits indicated by the signals decreases. In some embodiments, the code rates of the signals transmitted between the controller and the memory integrated circuits are decreased after the error rate of bits indicated by the signals increases. For example, the code rates of the signals can be changed by encoding the read data, write data, commands, and/or addresses with a different error detection and/or error correction code or by providing the read data, write data, commands, and/or addresses without encoded information.

Figure 1:
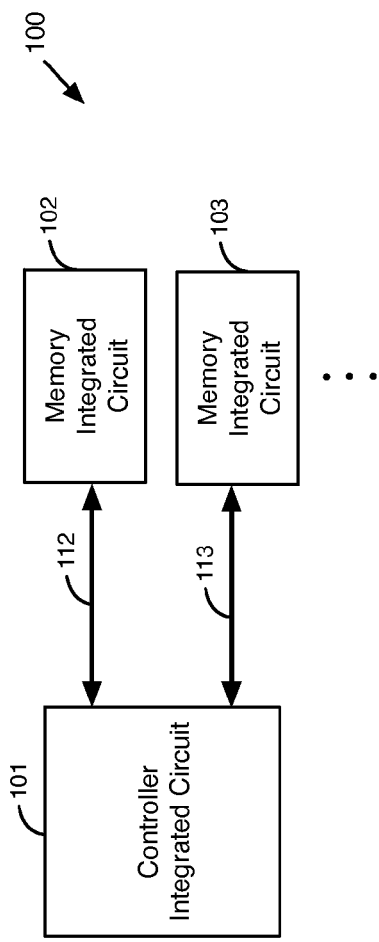
FIG. 1 illustrates an example of a system that has a controller integrated circuit and two or more memory integrated circuits.

FIG. 1 illustrates an example of a system 100 that has a controller integrated circuit 101 and one or more memory integrated circuits. FIG. 1 illustrates two memory integrated circuits 102-103 as an example. The system 100 of FIG. 1 may have any number of memory integrated circuits. For example, system 100 may have 1, 2, 3, 4, 5, 6, 7, etc. memory integrated circuits.

Controller integrated circuit 101 communicates with each of the one or more memory integrated circuits in system 100. As shown in FIG. 1, controller integrated circuit 101 communicates with memory integrated circuit 102 through external conductors in bus 112, and controller integrated circuit 101 communicates with memory integrated circuit 103 through external conductors in bus 113. Controller integrated circuit 101 is also referred to as a memory controller device.

Figure 2:
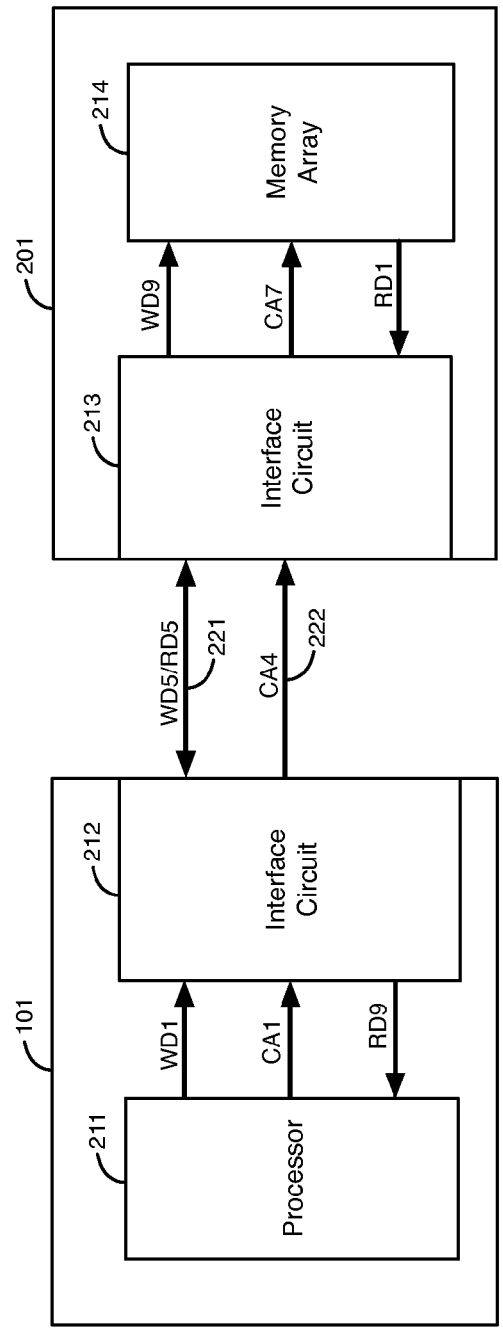
FIG. 2 illustrates additional details of the controller integrated circuit and one of the memory integrated circuits in the system of FIG. 1.

FIG. 2 illustrates additional details of controller integrated circuit 101 and one of the memory integrated circuits 201 in system 100. Memory integrated circuit 201 may be any of the memory integrated circuits in system 100. For example, memory integrated circuit 201 may be memory integrated circuit 102 or 103.

Controller integrated circuit 101 includes a processor circuit 211 and an interface circuit 212. Memory integrated circuit 201 includes an interface circuit 213 and a memory array circuit 214. Controller integrated circuit 101 may have one, two, three, or more interface circuits 212 that communicate with memory integrated circuit 201. Memory integrated circuit 201 may have one, two, three or more interface circuits 213 that communicate with controller integrated circuit 101.

Controller integrated circuit 101 initiates a write transaction to store data in memory integrated circuit 201 and a read transaction to access data stored in memory integrated circuit 201. Processor circuit 211 generates signals WD1 that indicate write data and signals CA1 that indicate an address and a write command for each write transaction. The write command instructs memory array circuit 214 to store the write data at the memory location identified by the address. Signals CA1 and WD1 are provided to interface circuit 212.

Interface circuit 212 provides signals WD5 that indicate the write data to interface circuit 213 in memory integrated circuit 201 through external conductors 221. Interface circuit 212 provides signals CA4 that indicate the write command and the address to interface circuit 213 through external conductors 222. Interface circuit 213 provides signals WD9 that indicate the write data to memory array circuit 214. Interface circuit 213 provides signals CA7 that indicate the address and the write command to memory array circuit 214.

Processor circuit 211 generates signals CA1 that indicate an address and a read command for each read transaction. The read command instructs memory array circuit 214 to retrieve data stored at a memory location identified by the address. Signals CA1 are provided to interface circuit 212. Interface circuit 212 provides signals CA4 that indicate the address and the read command to interface circuit 213 through external conductors 222. Interface circuit 213 provides signals CA7 that indicate the address and the read command to memory array circuit 214.

In response to the read command, memory array circuit 214 provides the read data stored at the memory location identified by the address. Signals RD1 that indicate the read data retrieved from memory array circuit 214 are provided to interface circuit 213. Interface circuit 213 provides signals RD5 that indicate the read data to interface circuit 212 through external conductors 221. Signals RD5 are transmitted through the same external conductors 221 that are used to transmit signals WD5 during write transactions in the embodiment of FIG. 2. Interface circuit 212 provides signals RD9 that indicate the read data to processor circuit 211.

In an alternative embodiment, signals WD5 are transmitted from controller integrated circuit 101 to memory integrated circuit 201 through a first set of external conductors, and signals RD5 are transmitted from memory integrated circuit 201 to controller integrated circuit 101 through a second set of external conductors. In another embodiment, each of the commands, the addresses, and the data for read and write transactions is transmitted through the same external conductors between controller integrated circuit 101 and memory integrated circuit 201. In some embodiments of system 100 that have multiple memory integrated circuits, the same external conductors are used to transmit signals WD5 and RD5 between controller integrated circuit 101 and each of the memory integrated circuits. In other embodiments, a different set of external conductors is used to transmit signals WD5 and RD5 between controller integrated circuit 101 and each of the memory integrated circuits in system 100.

Several parameters in system 100 of FIG. 1 affect the error rate of bits indicated by signals transmitted between controller integrated circuit 101 and the memory integrated circuits during read and write transactions. A change in one or more of these parameters may cause the error rate of bits in the signals to increase. Examples of parameters that may affect the error rate of bits in the signals include supply voltages provided to interface circuits 212-213, the temperatures of the integrated circuits in system 100, and the duty cycles and frequencies of the clock signals used to serialize and deserialize the signals.

In general, system 100 has at least two states in which power is consumed, referred to herein as power modes: e.g., a power-up mode and a low power mode. The power-up mode may, for example, correspond to several active states of the memory integrated circuits, such as idle (wherein the memory array circuit 214 is pre-charged), active (wherein a row has been activated), and active refresh (wherein a single row is being refreshed). In the power-up mode, interface circuits on both controller integrated circuit 101 and memory integrated circuit 201 are powered up.

System 100 may enter a low power mode when memory integrated circuit 201 is not being accessed for read and write transactions in order to reduce power consumption. In an example low power mode, the interface circuits in controller integrated circuit 101 and/or in memory integrated circuit 201 can be selectively powered down, and optionally internal clock generation circuits may be powered down during specific low power modes. Various techniques can be used to place an interface circuit in a low power mode. For example, an interface circuit may have a current source that can be enabled or disabled (i.e., turned off) based on the power mode. In addition, the supply voltage for each individual interface circuit can be controlled separately. During the low power mode, controller integrated circuit 101 may reduce a supply voltage provided to interface circuit 212, and memory integrated circuit 201 may reduce supply voltages provided to interface circuit 213 and memory array circuit 214.

The clock signals provided to any of the interface circuits can be gated off when the interface circuit is in low power mode. During the low power mode, controller integrated circuit 101 may turn off any clock signals or strobe signals that are provided to interface circuit 212 during normal operation, and memory integrated circuit 201 may turn off any circuitry that provides clock signals or strobe signals to interface circuit 213 and memory array circuit 214.

Controller integrated circuit 101 ends the lower power mode before activating a row, writing data, or reading data from memory integrated circuit 201. After the low power mode ends, the supply voltages are increased back to their normal operating voltages and any clock signals or strobe signals that were turned off in low power mode are turned on again and provided to interface circuits 212-213 and memory array circuit 214.

For a period of time after low power mode ends, clock signals and strobe signals that were turned off in low power mode may have increased frequency drift and duty cycle distortion, and power supply transients may occur in the supply voltages that were reduced in low power mode. Also, for a period of time after controller integrated circuit 101 and the memory integrated circuits in system 100 power up after being in an off state, clock signals and/or strobe signals, supply voltages, and other parameters used for the transmission of signals for read and write transactions may vary from ideal, nominal, or previous values. If signals for read and write transactions are transmitted between controller integrated circuit 101 and memory integrated circuit 201 during one of these periods of time after a low power mode or an off state, interface circuits 212-213 may generate a larger percentage of sampling errors in the signals (i.e., a larger error rate).

Each of the memory integrated circuits in system 100 may enter and exit a low power mode several times during the operation of system 100 to reduce power consumption. The delay between the end of low power mode and when the clock signals, the supply voltages, and other signals that impact data transmission have reached stable values may, for example, be a few microseconds in some systems, which may significantly reduce the data transmission throughput.

Other parameters may also affect the error rate of bits indicated by signals that are transmitted between controller integrated circuit 101 and the memory integrated circuits during read and write transactions. For example, a change in the temperature of controller integrated circuit 101 and/or memory integrated circuit 201 may cause interface circuits 212-213 to generate a larger error rate of bits in the signals that are transmitted between these integrated circuits.

Figure 3:
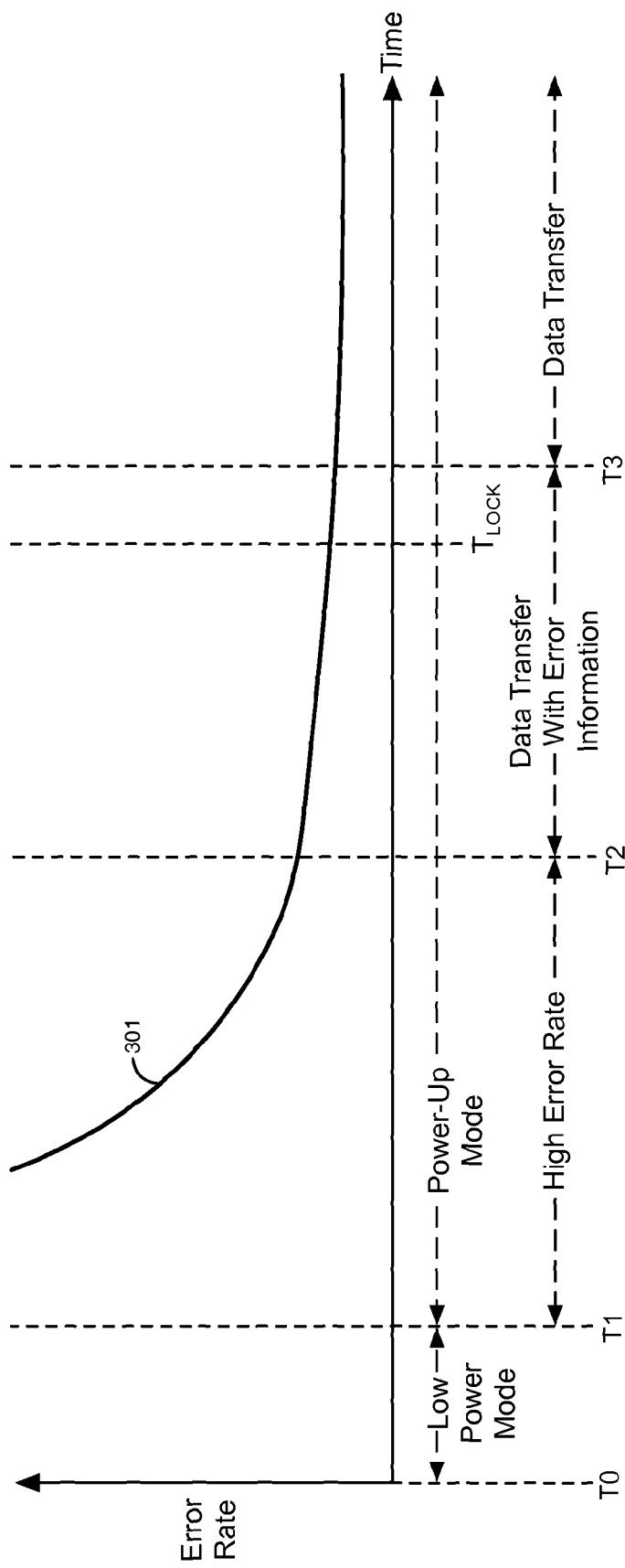
FIG. 3 is a graph illustrating an exemplary curve of the error rate of bits in a signal that is transmitted between the controller integrated circuit and the memory integrated circuit of FIG. 2 after the system exits a low power mode.

FIG. 3 is a graph illustrating an exemplary curve 301 of the error rate of bits in a data signal that is transmitted between controller integrated circuit 101 and memory integrated circuit 201 after system 100 exits a low power mode. Curve 301 is merely an illustrative example of an error rate of bits in a data signal. As shown in FIG. 3, memory integrated circuit 201 is in the low power mode between time T0 and time T1. At time T1, memory integrated circuit 201 switches from low power mode to power-up mode. After exiting low power or power-down mode, memory integrated circuit 201 may begin to transmit and/or receive data for read and write transactions.

After time T1, the error rate of bits in the data signal decreases as shown by curve 301. Between time T1 and time T2, variations in the clock signals, strobe signals, supply voltages, and/or other signals that impact data transmission cause a high error rate of bits indicated by the data signal. In an embodiment, data is not transmitted between integrated circuits in system 100 before time T2.

A phase-locked loop or delay-locked loop in controller integrated circuit 101 generates an output clock signal based on an input reference clock signal. The output clock signal is used to serialize and deserialize signals for read and write transactions in interface circuit 212. In some embodiments, the output clock signal is a source synchronous clock signal that is transmitted to memory integrated circuit 201 and used to serialize and deserialize signals for read and write transactions in interface circuit 213. In other embodiments, memory integrated circuit 201 has a phase-locked loop or delay-locked loop that generates a clock signal used to serialize and deserialize signals for read and write transactions in interface circuit 213.

Time $T_{LOCK}$ in FIG. 3 is a time when one or more parameters affecting equilibrium channel characteristics have reached stable values. For example, $T_{LOCK}$ may be the time at which phase or frequency lock has been achieved by one or more of the phase-locked loops or delay-locked loops in controller integrated circuit 101 and memory integrated circuit 201. Alternatively, $T_{LOCK}$ may be the time at which one or more supply voltages or voltages generated by charge pumps have reached stable values.

According to some embodiments, system 100 begins to transmit signals for read and write transactions between controller integrated circuit 101 and memory integrated circuit 201 before time $T_{LOCK}$. In the example of FIG. 3, system 100 begins to transmit signals for read and write transactions between controller integrated circuit 101 and memory integrated circuit 201 at time T2 before time $T_{LOCK}$. Time T2 may be, for example, a predetermined period of time (i.e., T2−T1) after the end of low power mode.

At time T2, variations in the clock signals, strobe signals, supply voltages, and/or other signals that impact data transmission have decreased significantly. However, the error rate of bits indicated by the data signal is larger at time T2 than at time T3 as shown by curve 301 in FIG. 3. The larger error rate of bits indicated by the data signal between times T2 and T3 can be compensated for by encoding the data signal. In some embodiments, system 100 encodes the data signal with encoded information between time T2 and time T3. The encoded information is used by system 100 to detect and/or correct errors in the data signal between times T2 and T3. The errors are generated in the data signal during the transmission of the data signal between controller integrated circuit 101 and memory integrated circuit 201. The encoded information is used to detect and/or correct the errors that are generated in the data signal before time T3 when the error rate of bits in the data signal is greater than after time T3.

In some embodiments, system 100 stops encoding the data signal with encoded information after time T3, because the error rate of bits indicated by the data signal is low enough. After time T3, a data signal is transmitted between controller integrated circuit 101 and memory integrated circuit 201 without additional encoded information. Because the data signal is transmitted between the integrated circuits in system 100 without the additional encoded information after time T3, the transfer rate of data between the integrated circuits is significantly greater after time T3.

In some embodiments, system 100 encodes a data or control signal using an error detection/correction code having a first code rate to generate a first encoded signal. The first encoded signal is transmitted between integrated circuits 101 and 201. After system 100 detects or corrects an error in the first encoded signal, system 100 begins to encode the data or control signal at a second code rate that is less than the first code rate to generate a second encoded signal. The second code rate provides more redundant information with the second encoded signal relative to the first encoded signal. The second encoded signal is transmitted between integrated circuits 101 and 201.

Figure 4A:
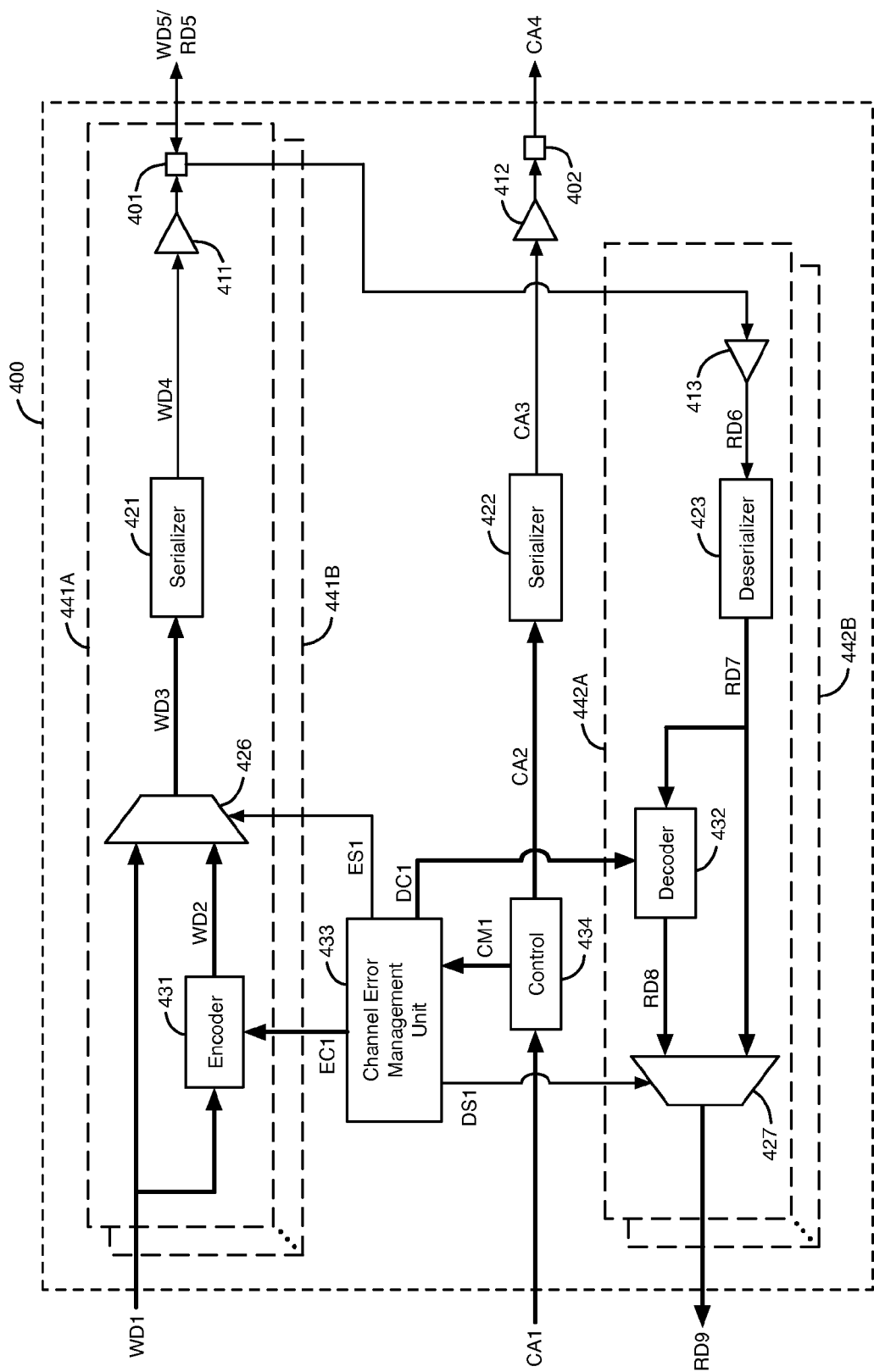
FIG. 4A illustrates an example of an interface circuit in the controller integrated circuit of FIG. 2 that transfers data with the memory integrated circuit of FIG. 2.

FIG. 4A illustrates an example of an interface circuit 400 that transfers data with memory integrated circuit 201. Interface circuit 400 is an example of interface circuit 212 in controller integrated circuit 101. Interface circuit 400 may encode data transmitted to or decode data received from memory integrated circuit 201 based on an error control command that is part of a read or write transaction.

Figure 4B:
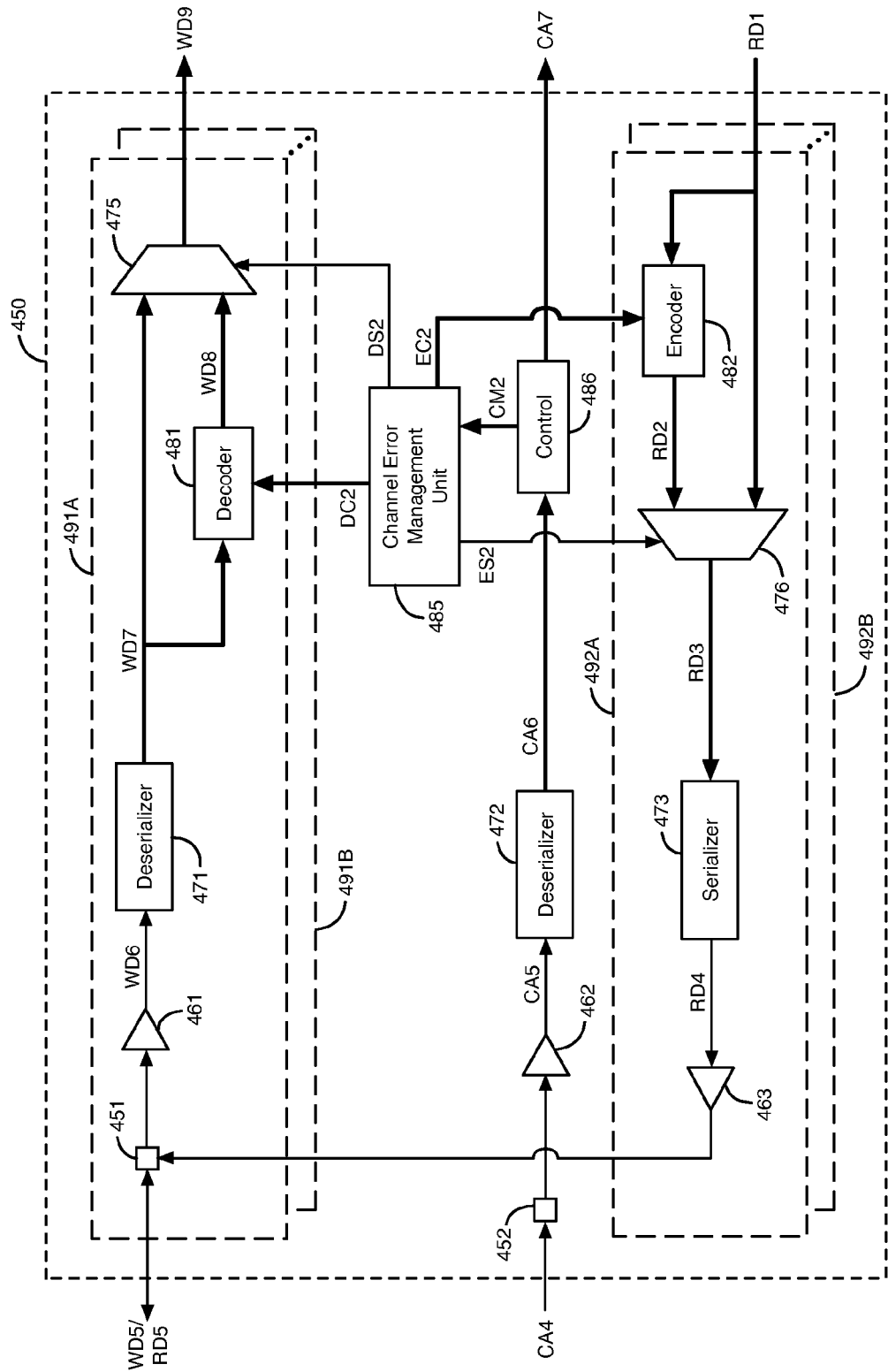
FIG. 4B illustrates an example of an interface circuit in the memory integrated circuit of FIG. 2 that transfers data with the interface circuit of FIG. 4A.

FIG. 4B illustrates an example of an interface circuit 450 that transfers data with controller integrated circuit 101. Interface circuit 450 is an example of interface circuit 213 in memory integrated circuit 201. Interface circuit 450 may encode data transmitted to or decode data received from controller integrated circuit 101 based on an error control command that is part of a read or write transaction.

Interface circuit 400 has one or more transmitting interface circuits. Two transmitting interface circuits 441A-441B are shown in FIG. 4A as an example. Transmitting interface circuit 441A includes pin 401, output buffer circuit 411, serializer circuit 421, multiplexer circuit 426, and encoder circuit 431. Transmitting interface circuit 441B and any other transmitting interface circuits in interface circuit 400 have the same circuit structure as transmitting interface circuit 441A. Each of the transmitting interface circuits in interface circuit 400 functions as described below with respect to transmitting interface circuit 441A.

Interface circuit 400 also has one or more receiving interface circuits. Two receiving interface circuits 442A-442B are shown in FIG. 4A as an example. Receiving interface circuit 442A includes input buffer circuit 413, deserializer circuit 423, decoder circuit 432, and multiplexer circuit 427. Receiving interface circuit 442B and any other receiving interface circuits in interface circuit 400 have the same circuit structure as receiving interface circuit 442A. Each of the receiving interface circuits in interface circuit 400 functions as described below with respect to receiving interface circuit 442A. Interface circuit 400 also includes pin 402, output buffer circuit 412, serializer circuit 422, control circuit 434, and channel error management unit circuit 433.

Interface circuit 450 has one or more receiving interface circuits. Two receiving interface circuits 491A-491B are shown in FIG. 4B as an example. Receiving interface circuit 491A includes pin 451, input buffer circuit 461, deserializer circuit 471, decoder circuit 481, and multiplexer circuit 475.

Receiving interface circuit 491B and any other receiving interface circuits in interface circuit 450 have the same circuit structure as receiving interface circuit 491A. Each of the receiving interface circuits in interface circuit 450 functions as described below with respect to receiving interface circuit 491A.

Interface circuit 450 also has one or more transmitting interface circuits. Two transmitting interface circuits 492A-492B are shown in FIG. 4B as an example. Transmitting interface circuit 492A includes output buffer circuit 463, serializer circuit 473, multiplexer circuit 476, and encoder circuit 482. Transmitting interface circuit 492B and any other transmitting interface circuits in interface circuit 450 have the same circuit structure as transmitting interface circuit 492A. Each of the transmitting interface circuits in interface circuit 450 functions as described below with respect to transmitting interface circuit 492A. Interface circuit 450 also includes pin 452, input buffer circuit 462, deserializer circuit 472, control circuit 486, and channel error management unit circuit 485.

In the embodiment of FIGS. 4A-4B, controller integrated circuit 101 generates an error control command that indicates whether to transmit information to or from memory integrated circuit 201 for a read or write transaction that has been generated using error detection/correction encoding. During each read transaction, controller integrated circuit 101 generates signals CA1 that indicate the error control command, a read command, and an address identifying a memory location. During each write transaction, controller integrated circuit 101 generates signals CA1 that indicate the error control command, a write command, and an address identifying a memory location.

Signals CA1 are provided in parallel to inputs of control circuit 434. Control circuit 434 generates signals CM1 based on signals CA1. Signals CM1 indicate the error control command indicated by signals CA1. Signals CM1 are provided in parallel to inputs of channel error management unit 433.

Control circuit 434 generates signals CA2 based on signals CA1. Signals CA2 indicate the error control command, the read or write command, and the address that are indicated by signals CA1. Control circuit 434 may, for example, include storage circuits that store signals CA2 and CM1.

Signals CA2 are provided in parallel to inputs of serializer circuit 422. Serializer circuit 422 serializes signals CA2 to generate serial signal CA3. Signal CA3 indicates the read or write command, the error control command, and the address indicated by signals CA2. Output buffer circuit 412 buffers signal CA3 to generate a buffered signal CA4 that indicates the read or write command, the error control command, and the address indicated by signal CA3. Signal CA4 is transmitted through pin 402 to interface circuit 450 in memory integrated circuit 201.

Referring to FIG. 4B, signal CA4 is provided to the input of input buffer circuit 462 through pin 452. Input buffer circuit 462 buffers signal CA4 to generate a buffered signal CA5 that indicates the read or write command, the error control command, and the address indicated by signal CA4. Signal CA5 is provided to an input of deserializer circuit 472. Deserializer circuit 472 deserializes signal CA5 to generate signals CA6. Signals CA6 indicate the read or write command, the error control command, and the address indicated by signal CA5. Signals CA6 are provided in parallel to inputs of control circuit 486. Control circuit 486 generates signals CA7 based on signals CA6. Signals CA7 indicate the read or write command and the address indicated by signals CA6 and CA1. Signals CA7 may also indicate the error control command or error control command status.

In an alternative embodiment, interface circuit 400 does not include serializer circuit 422, and interface circuit 450 does not include deserializer circuit 472. In this embodiment, parallel signals CA2 are buffered to generate multiple parallel signals CA4 that indicate the error control command, the read or write command, and the address. Signals CA4 are transmitted in parallel to memory integrated circuit 201, as shown in FIG. 2. Signals CA4 are buffered in interface circuit 450 to generate signals CA6 that indicate the error control command, the read or write command, and the address. Signals CA6 are provided to inputs of control circuit 486. Control circuit 486 generates signals CA7 based on signals CA6, as described above. This embodiment may, for example, be implemented with a communication protocol that defines read and write commands and addresses to be communicated in a single cycle of a clock signal.

Control circuit 486 also generates signals CM2 based on signals CA6. Signals CM2 identify the error control command that is indicated by signals CA6 and CM1. Signals CM2 are provided in parallel to inputs of channel error management unit 485. Control circuit 486 may, for example, include storage circuits that store signals CM2 and CA7.

Processor circuit 211 generates write data for each write transaction. Each of the transmitting interface circuits in interface circuit 400, including transmitting interface circuits 441A-441B, receives a subset of the write data generated for each write transaction. Signals WD1 shown in FIG. 4A indicate the subset of the write data provided to transmitting interface circuit 441A. Signals WD1 are provided in parallel to first multiplexing inputs of multiplexer circuit 426 and to inputs of encoder circuit 431.

As discussed above, multiple parameters affect the channel signal-to-noise ratio or error rates of bits indicated by the signals WD5, CA4, and RD5 that are transmitted between controller integrated circuit 101 and memory integrated circuit 201. If one of these parameters changes, the error rates of bits in one or more of signals WD5, CA4, and RD5 may increase. The error rates of bits indicated by one or more of signals WD5, CA4, and RD5 may be greater than a typical value for a period of time after one of these parameters changes, as shown for example in FIG. 3.

Processor circuit 211 may cause interface circuit 400 to provide encoded information generated by encoder circuit 431 for a period of time after one of these parameters changes. In the example of FIG. 3, this period of time is time T2 to time T3. Processor circuit 211 generates signals CA1 that indicate an error control command for instructing interface circuit 400 to provide the encoded information for each of the write transactions initiated during this period of time. Alternatively, processor circuit 211 may cause interface circuit 400 to provide encoded information generated by encoder circuit 431 during a predefined number of write transactions occurring after one of these parameters changes.

Encoder circuit 431 encodes the write data indicated by signals WD1 to generate signals WD2 that indicate encoded information at its outputs using an error detection and/or error correction code (i.e., error detection/correction code). The encoded information may, for example, include codewords that are generated by the error detection/correction code using the write data. The encoded information indicated by signals WD2 is used by a decoder circuit in memory integrated circuit 201 to recover the write data and to detect and/or correct any errors in the write data.

In some embodiments, encoder circuit 431 generates encoded information using a selected one of two or more error detection/correction codes. If the error control command indicated by signals CM1 indicates to provide encoded information for a write transaction, the error control command is also used to select an error detection/correction code for encoder circuit 431. Channel error management unit 433 generates control signals EC1 based on an error control command that indicates to provide the encoded information. Control signals EC1 are provided in parallel to inputs of encoder circuit 431.

Control signals EC1 select the error detection/correction code that encoder circuit 431 uses to encode the write data indicated by signals WD1 to generate the encoded information indicated by signals WD2. Control signals EC1 may also select the code rate of the encoded information indicated by signals WD2. In some embodiments, each unique error detection/correction code that can be implemented by encoder circuit 431 generates a unique code rate in the encoded information. Signals WD2 are provided in parallel to second multiplexing inputs of multiplexer circuit 426.

The encoded information indicated by signals WD2 includes redundant error correction and/or detection information (i.e., redundant information). Encoder circuit 431 uses the write data to generate the redundant error correction and/or detection information indicated by signals WD2. The redundant error correction and/or detection information indicated by signals WD2 is used by a decoder circuit to detect and/or correct any errors in the write data received by memory integrated circuit 201.

Encoder circuit 431 may use a systematic error detection/correction code or non-systematic error detection/correction code to generate signals WD2. If a systematic error detection/correction code is employed, the redundant information may be appended to or interleaved with the write data. If a non-systematic error detection/correction code is used, the write data and redundant information are computed and combined in such a fashion that they are not trivially separable or identifiable.

Channel error management unit 433 generates control signal ES1 based on the error control command indicated by signals CM1. Control signal ES1 is provided to the select input of multiplexer circuit 426. Multiplexer circuit 426 provides the write data indicated by signals WD1 or the encoded information indicated by signals WD2 to its outputs as indicated by signals WD3 based on control signal ES1.

When channel error management unit 433 receives an error control command indicating to provide encoded information for a write transaction, channel error management unit 433 generates a first value for control signal ES1 that causes multiplexer circuit 426 to provide the encoded information indicated by signals WD2 to its outputs. Multiplexer circuit 426 causes signals WD3 at its outputs to indicate the encoded information based on the first value of control signal ES1.

After a period of time or after a predefined number of read or write transactions following a change in a parameter that affects the error rate of the write data, the error rate of bits indicated by signals WD5 has decreased enough such that the encoded information generated by encoder circuit 431 is no longer needed. Processor circuit 211 generates an error control command for each write transaction initiated after this period of time or after the predefined number of read or write transactions that instructs interface circuit 400 to provide the write data without encoded information generated by encoder circuit 431. When channel error management unit 433 receives an error control command that indicates to provide the write data without encoded information, channel error management unit 433 generates a second value for control signal ES1 that causes multiplexer circuit 426 to provide the write data indicated by signals WD1 to its outputs. Multiplexer circuit 426 causes signals WD3 at its outputs to indicate the write data based on the second value of control signal ES1.

Signals WD3 are provided in parallel to inputs of serializer circuit 421. Serializer circuit 421 serializes the parallel signals WD3 to generate serial signal WD4. Signal WD4 is provided to an input of output buffer circuit 411. Output buffer circuit 411 buffers signal WD4 to generate a buffered signal WD5 at the output of buffer circuit 411. Each of signals WD4 and WD5 includes serial bits that indicate the write data or the encoded information indicated by signals WD3. Each of the transmitting interface circuits 441A-441B transmits one of signals WD5 from the output of its output buffer circuit 411 through its pin 401, an external conductor, and a pin 451 to the input of an input buffer circuit 461 in a respective one of receiving interface circuits 491A-491B in memory integrated circuit 201.

Input buffer circuit 461 in receiving interface circuit 491A buffers signal WD5 from transmitting interface circuit 441A to generate a buffered signal WD6 at the input of deserializer circuit 471. Deserializer circuit 471 converts serial signal WD6 to parallel signals WD7. Signals WD7 indicate the write data or the encoded information indicated by signal WD5. Signals WD7 are provided in parallel to first multiplexing inputs of multiplexer circuit 475 and to inputs of decoder circuit 481.

The error control command indicated by signals CM2 indicates if interface circuit 400 provided encoded information generated by encoder circuit 431. If the error control command indicates that interface circuit 400 provided encoded information generated by encoder circuit 431, then the error control command also indicates an error detection/correction code for decoder circuit 481 to use to decode the encoded information indicated by signals WD7. Channel error management unit 485 generates control signals DC2 based on the error control command indicated by signals CM2. Control signals DC2 are provided in parallel to inputs of decoder circuit 481. The control signals DC2 select an error detection/correction code. Decoder circuit 481 decodes the encoded information indicated by signals WD7 to generate signals WD8 that indicate the write data using the error detection/correction code selected by control signals DC2. Decoder circuit 481 detects and/or corrects any errors in the write data using the selected error detection/correction code. Signals WD8 indicate the same write data as signals WD1. Signals WD8 are provided in parallel to second multiplexing inputs of multiplexer circuit 475.

Channel error management unit 485 generates control signal DS2 based on the error control command for the write transaction indicated by signals CM2. Control signal DS2 is provided to the select input of multiplexer circuit 475. Multiplexer circuit 475 provides the write data indicated by signals WD7 or the decoded write data indicated by signals WD8 to its outputs as indicated by signals WD9 based on control signal DS2. In response to an error control command that indicates signals WD7 are encoded, channel error management unit 485 generates a first value for control signal DS2 that causes multiplexer circuit 475 to provide the decoded write data indicated by signals WD8 to its outputs. Multiplexer circuit 475 causes parallel signals WD9 at its outputs to indicate the decoded write data based on the first value of control signal DS2. If decoder circuit 481 is unable to correct all of the errors in the write data, the uncorrectable error status of the write data may be logged in channel error management unit 485, the write transaction is aborted, and uncorrectable error recovery actions may be initiated. The occurrence of correctable errors may also be logged in channel error management unit 485.

In response to an error control command that indicates signals WD7 do not have encoded information, channel error management unit 485 generates a second value for control signal DS2 that causes multiplexer circuit 475 to provide the write data indicated by signals WD7 to its outputs. Multiplexer circuit 475 causes parallel signals WD9 at its outputs to indicate the write data from signals WD7 based on the second value of control signal DS2. The write data indicated by signals WD9 is stored in memory array circuit 214 at the address indicated by signals CA7 in response to the write command indicated by signals CA7.

Memory integrated circuit 201 generates read data for each read transaction in response to receiving signals CA7 that indicate an address and a read command. The read data is retrieved from memory array circuit 214 at the address. Each of the transmitting interface circuits shown in FIG. 4B, including transmitting interface circuits 492A-492B, receives a subset of the read data retrieved from memory array circuit 214 for each read transaction. Signals RD1 indicate the subset of the read data provided to transmitting interface circuit 492A. Signals RD1 are provided in parallel to first multiplexing inputs of multiplexer circuit 476 and to inputs of encoder circuit 482.

Interface circuit 450 determines whether to provide encoded information generated by encoder circuit 482 using the read data based on the error control command indicated by signals CM2. In some embodiments, processor circuit 211 generates error control commands that indicate to provide encoded information generated using the read data for a period of time after a change in a parameter that affects the error rate of the read data. In other embodiments, processor circuit 211 generates error control commands that indicate to provide encoded information generated using the read data during each of a predefined number of read transactions occurring after a change in a parameter that affects the error rate of the read data. Processor circuit 211 generates signals CA1 that indicate an error control command for instructing interface circuit 450 to provide encoded information generated using the read data for each of the read transactions initiated according to one of these conditions.

Encoder circuit 482 encodes the read data indicated by signals RD1 to generate signals RD2 that indicate encoded information using an error detection/correction code. The encoded information may include, for example, codewords that are generated by the error detection/correction code using the read data. The encoded information indicated by signals RD2 is used by a decoder in controller integrated circuit 101 to recover the read data and to detect and/or correct any errors in the read data. Signals RD2 are generated at the output of encoder circuit 482 and provided in parallel to second multiplexing inputs of multiplexer circuit 476.

In some embodiments, encoder circuit 482 generates encoded information indicated by signals RD2 using a selected one of two or more error detection/correction codes. Signals CM2 indicate the error control command for the read transaction. If the error control command for the read transaction indicates to provide encoded information generated using the read data, the error control command also indicates an error detection/correction code for encoder circuit 482 to use to encode the read data to generate signals RD2. Channel error management unit 485 generates control signals EC2 based on an error control command received from signals CM2 that indicates to provide encoded information. Control signals EC2 are provided in parallel to inputs of encoder circuit 482. Control signals EC2 select the error detection/correction code that encoder circuit 482 uses to encode signals RD1 to generate the encoded information indicated by signals RD2.

Control signals EC2 may also select the code rate of the encoded information indicated by signals RD2. In some embodiments, each unique error detection/correction code that can be implemented by encoder circuit 482 generates a unique code rate in the encoded information indicated by signals RD2.

The encoded information indicated by signals RD2 includes redundant information. Encoder circuit 482 uses the read data to generate the redundant information indicated by signals RD2. The redundant information indicated by signals RD2 is used by a decoder circuit to detect and/or correct any errors in the read data received by controller integrated circuit 101. The redundant information may, for example, include redundant error detection/correction bits.

Encoder circuit 482 may use a systematic error detection/correction code or a non-systematic error detection/correction code to generate signals RD2. If a systematic error detection/correction code is employed, the redundant information may be appended to or interleaved with the read data. If a non-systematic error detection/correction code is used, the read data and redundant information are computed and combined in such a fashion that they are not trivially separable or identifiable.

Channel error management unit 485 generates control signal ES2 based on the error control command indicated by signals CM2. Control signal ES2 is provided to a select input of multiplexer circuit 476. Multiplexer circuit 476 provides the read data indicated by signals RD1 or the encoded information indicated by signals RD2 to its outputs as indicated by signals RD3 based on control signal ES2. When channel error management unit 485 receives an error control command that indicates to provide encoded information generated using the read data, channel error management unit 485 generates a first value for control signal ES2 that causes multiplexer circuit 476 to provide the encoded information indicated by signals RD2 to its outputs. Multiplexer circuit 476 causes parallel signals RD3 at its outputs to indicate the encoded information based on the first value of control signal ES2.

After a period of time or after a predefined number of read or write transactions following a change in a parameter that affects the channel signal/noise ratio or the error rate of the read data, the error rate of bits indicated by signals RD5 has decreased enough such that the code rate of the bits indicated by signals RD5 can be increased to unity. Processor circuit 211 generates an error control command for each read transaction initiated after this period of time or after the predefined number of read or write transactions that instructs interface circuit 450 to provide the read data without encoded information generated by encoder circuit 482. When the error control command indicates to provide the read data without encoded information, channel error management unit 485 generates a second value for control signal ES2 that causes multiplexer circuit 476 to provide the read data as indicated by signals RD1 to its outputs. Multiplexer circuit 476 causes parallel signals RD3 at its outputs to indicate the read data as received from signals RD1 based on the second value of control signal ES2.

Signals RD3 are provided in parallel to inputs of serializer circuit 473. Serializer circuit 473 serializes parallel signals RD3 to generate serial signal RD4. Signal RD4 is provided to an input of output buffer circuit 463. Output buffer circuit 463 buffers signal RD4 to generate a buffered signal RD5 at the output of buffer circuit 463. Each of signals RD4 and RD5 includes serial bits that indicate the read data or the encoded information indicated by signals RD3. Each of the transmitting interface circuits 492A-492B transmits a signal RD5 from the output of its output buffer circuit 463 through a pin 451, an external conductor, and a pin 401 to the input of an input buffer circuit 413 in a respective one of receiving interface circuits 442A-442B in controller integrated circuit 101. During a read transaction, each signal RD5 is transmitted through the same external conductor that is used to transmit one of signals WD5 during a write transaction. The external conductor may be, for example, an optical waveguide.

Input buffer circuit 413 buffers signal RD5 to generate a buffered signal RD6 at the input of deserializer circuit 423. Deserializer circuit 423 converts serial signal RD6 to parallel signals RD7. Signals RD7 indicate the read data or the encoded information indicated by signals RD6, RD5, RD4, and RD3. Signals RD7 are provided in parallel to first multiplexing inputs of multiplexer circuit 427 and to inputs of decoder circuit 432.

The error control command indicated by signals CM1 indicates if interface circuit 450 provided encoded information generated by encoder circuit 482. If the error control command indicates that interface circuit 450 provided encoded information generated by encoder circuit 482, then the error control command indicated by signals CM1 also indicates an error detection/correction code for decoder circuit 432 to use to decode the encoded information indicated by signals RD7. The error control command also instructs interface circuit 400 to provide decoded information from decoder circuit 432.

When channel error management unit 433 receives an error control command from signals CM1 that indicates signals RD7 contain encoded information, channel error management unit 433 generates control signals DC1 based on the error control command. Control signals DC1 are provided in parallel to inputs of decoder circuit 432. Control signals DC1 select an error detection/correction code. Decoder circuit 432 decodes the encoded information indicated by signals RD7 to generate signals RD8 that indicate the read data using the error detection/correction code selected by control signals DC1. Decoder circuit 432 detects and/or corrects any errors in the read data using the selected error detection/correction code. Signals RD8 indicate the same read data as signals RD1. Signals RD8 are provided in parallel to second multiplexing inputs of multiplexer circuit 427. If decoder circuit 432 is unable to correct all of the errors in the read data, the uncorrectable error status of the read data may be logged in channel error management unit 433, the read transaction is aborted, and uncorrectable error recovery actions may be initiated. The occurrence of correctable errors may also be logged in channel error management unit 433.

Channel error management unit 433 generates control signal DS1 based on the error control command for the read transaction indicated by signals CM1. Control signal DS1 is provided to the select input of multiplexer circuit 427. Multiplexer circuit 427 provides the read data indicated by signals RD7 or the read data indicated by signals RD8 to its outputs as indicated by signals RD9 based on control signal DS1. In response to an error control command that indicates signals RD7 contain encoded information, channel error management unit 433 generates a first value for control signal DS1 that causes multiplexer circuit 427 to provide the read data as indicated by signals RD8 to its outputs. Multiplexer circuit 427 causes parallel signals RD9 at its outputs to indicate the read data as indicated by signals RD8 based on the first value of control signal DS1.

If the error control command indicated by signals CM2 instructed interface circuit 450 to provide the read data without encoded information generated by encoder circuit 482, then the error control command indicated by signals CM1 indicates that signals RD7 do not contain encoded information. In response to an error control command that indicates signals RD7 do not contain encoded information, channel error management unit 433 generates a second value for control signal DS1 that causes multiplexer circuit 427 to provide the read data indicated by signals RD7 to its outputs. Multiplexer circuit 427 causes parallel signals RD9 at its outputs to indicate the read data as indicated by signals RD7 based on the second value of control signal DS1. The read data indicated by signals RD9 is provided to processor circuit 211.

Figure 5A:
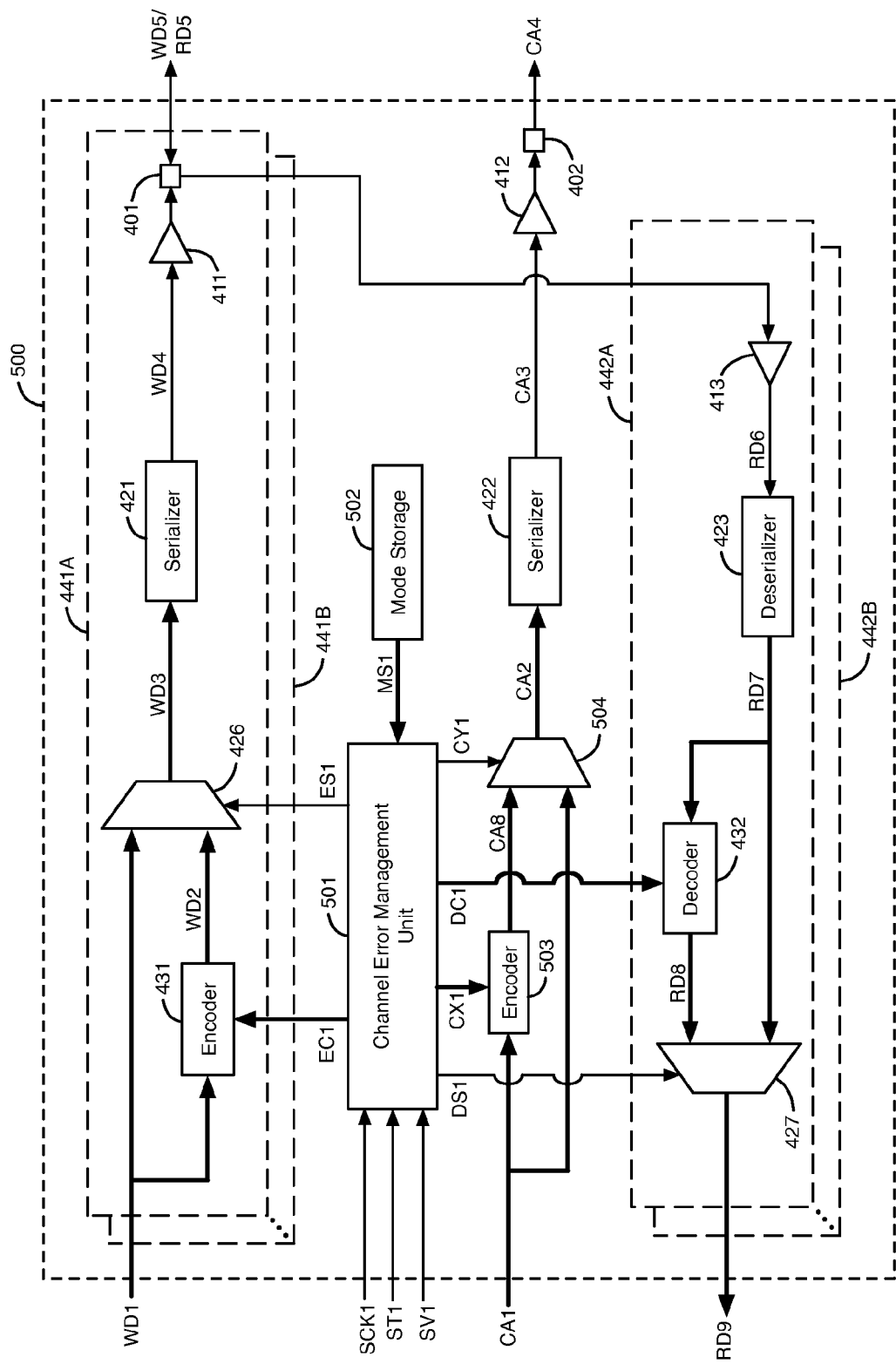
FIG. 5A illustrates another example of an interface circuit in the controller integrated circuit of FIG. 2 that transfers data with the memory integrated circuit of FIG. 2.

FIG. 5A illustrates an example of an interface circuit 500 that transfers data with memory integrated circuit 201. Interface circuit 500 is an example of interface circuit 212 in controller integrated circuit 101. Interface circuit 500 may encode data transmitted to or decode data received from memory integrated circuit 201 based on an error control command that is part of a read or write transaction.

Figure 5B:
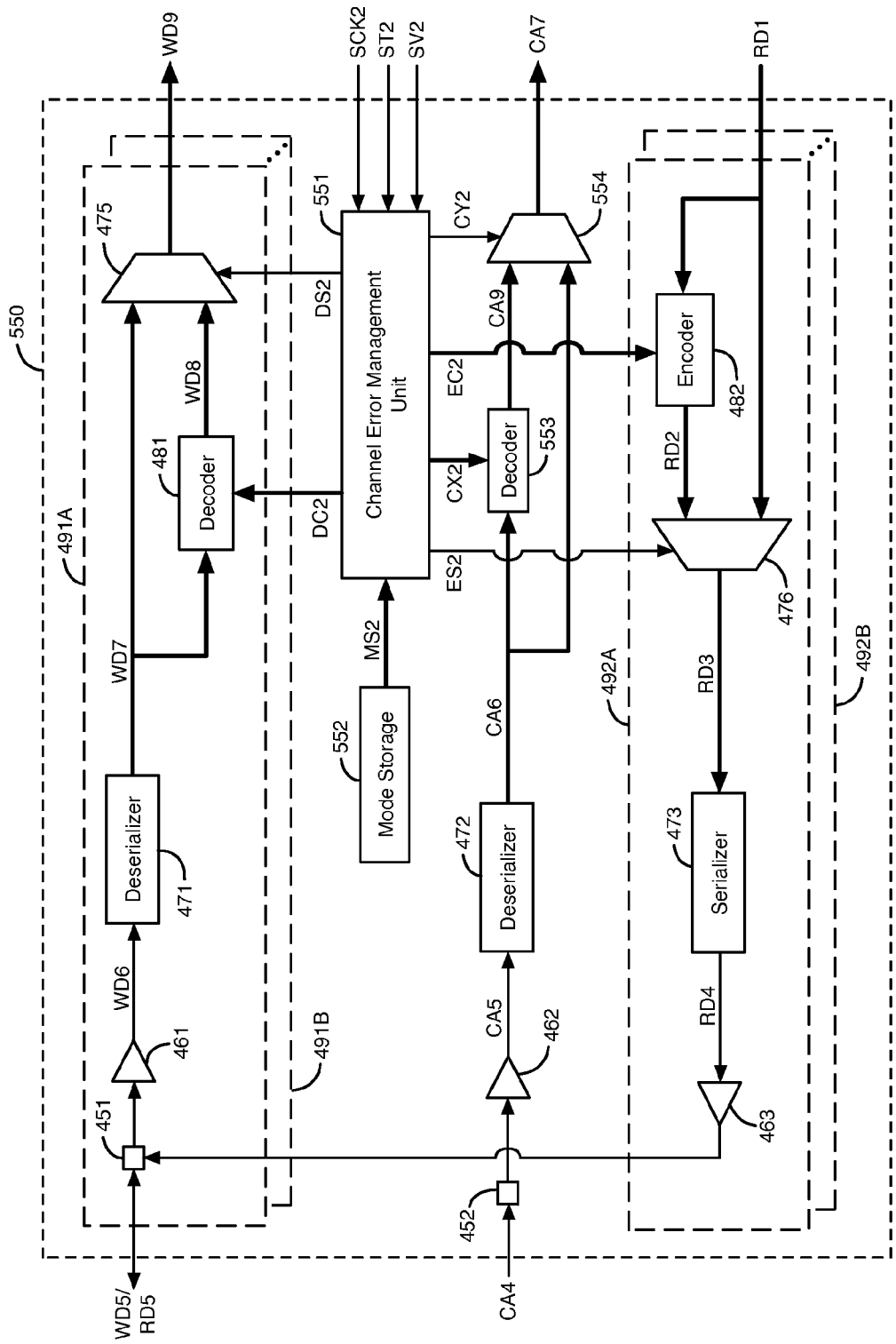
FIG. 5B illustrates an example of an interface circuit in the memory integrated circuit of FIG. 2 that transfers data with the interface circuit of FIG. 5A.

FIG. 5B illustrates an example of an interface circuit 550 that transfers data with controller integrated circuit 101. Interface circuit 550 is an example of interface circuit 213 in memory integrated circuit 201. Interface circuit 550 may encode data transmitted to or decode data received from controller integrated circuit 101 based on an error control command that is part of a read or write transaction.

Interface circuit 500 has one or more transmitting interface circuits, such as transmitting interface circuits 441A-441B. Interface circuit 500 also has one or more receiving interface circuits, such as receiving interface circuits 442A-442B. The transmitting and receiving interface circuits in interface circuit 500 function as described above with respect to interface circuits 441A and 442A, respectively. Interface circuit 500 also includes pin 402, output buffer circuit 412, serializer circuit 422, channel error management unit circuit 501, mode storage circuit 502, encoder circuit 503, and multiplexer circuit 504.

Interface circuit 550 has one or more receiving interface circuits, such as receiving interface circuits 491A-491B. Interface circuit 550 also has one or more transmitting interface circuits, such as transmitting interface circuits 492A-492B. The transmitting and receiving interface circuits in interface circuit 550 function as described above with respect to interface circuits 492A and 491A, respectively. Interface circuit 550 also includes pin 452, input buffer circuit 462, deserializer circuit 472, channel error management unit circuit 551, mode storage circuit 522, decoder circuit 553, and multiplexer circuit 554.

In the embodiment of FIGS. 5A-5B, error control commands indicate when to provide error detection/correction encoding and decoding to data, commands, and/or addresses transmitted between controller integrated circuit 101 and memory integrated circuit 201 for read and write transactions. The error control commands indicate when to activate and when to deactivate the error detection/correction encoding for the data, commands, and/or addresses. For example, the error control commands may indicate to encode and decode data, commands, and/or addresses for a predefined period of time, for a predefined number of clock signal periods, or for a predefined number of read and write transactions after a change in a parameter that affects an error rate of signals transmitted between integrated circuits 101 and 201. The error control commands may indicate the predefined period of time, the predefined number of clock signal periods, or the predefined number of read and write transactions. The error control commands may also indicate an error detection/correction code to use for the error detection/correction encoding and decoding.

One error control command is stored in mode storage circuit 502. Another error control command is stored in mode storage circuit 552. Mode storage circuits 502 and 552 may, for example, include volatile or non-volatile memory circuits. The error control commands may, for example, be stored in mode storage circuits 502 and 552 during the manufacture of the integrated circuits if mode storage circuits 502 and 552 include non-volatile memory circuits. Alternatively, the error control commands may be stored in mode storage circuits 502 and 552 during power-up mode or initialization after the respective integrated circuit has been in an off state.

Mode storage circuit 502 in interface circuit 500 generates mode signals MS1 that indicate an error control command. Mode signals MS1 are provided in parallel to inputs of channel error management unit 501. Channel error management unit 501 generates control signals EC1, ES1, DC1, DS1, CX1, and CY1 based on the error control command indicated by mode signals MS1. The control signals EC1, ES1, DC1, and DS1 generated by channel error management unit 501 control encoder circuit 431, multiplexer circuit 426, decoder circuit 432, and multiplexer circuit 427, respectively, as described above with respect to FIG. 4A.

In the embodiment of FIGS. 5A-5B, signals CA1 indicate the read command for each read transaction or the write command for each write transaction. Signals CA1 also indicate an address for each read or write transaction. Signals CA1 do not indicate error control commands for the read and write transactions. In interface circuit 500, signals CA1 are provided to inputs of encoder circuit 503 and to first multiplexing inputs of multiplexer circuit 504.

Control signals CX1 are provided in parallel to encoder circuit 503. Control signals CX1 select an error detection/correction code identified by the error control command indicated by signals MS1. Encoder circuit 503 uses the error detection/correction code to encode the information indicated by signals CA1 to generate signals CA8 that indicate encoded information. Control signals CX1 may also select a code rate of the encoded information indicated by signals CA8. Signals CA8 are provided in parallel to second multiplexing inputs of multiplexer circuit 504. Control signal CY1 is provided to the select input of multiplexer circuit 504. Multiplexer circuit 504 provides the information indicated by signals CA1 or the encoded information indicated by signals CA8 to its outputs as indicated by signals CA2 based on control signal CY1. Signals CA2 are provided in parallel to inputs of serializer circuit 422.

Mode storage circuit 552 in interface circuit 550 generates mode signals MS2 that indicate an error control command. Mode signals MS2 are provided in parallel to inputs of channel error management unit 551. Channel error management unit 551 generates control signals EC2, ES2, DC2, DS2, CX2, and CY2 based on the error control command indicated by mode signals MS2. The control signals EC2, ES2, DC2, and DS2 generated by channel error management unit 551 control encoder circuit 482, multiplexer circuit 476, decoder circuit 481, and multiplexer circuit 475, respectively, as described above with respect to FIG. 4B.

In interface circuit 550, signals CA6 are provided in parallel to first multiplexing inputs of multiplexer circuit 554 and to inputs of decoder circuit 553. Control signals CX2 are provided in parallel to inputs of decoder circuit 553. Control signals CX2 select an error detection/correction code based on the error control command indicated by signals MS2. Decoder circuit 553 decodes the encoded information indicated by signals CA6 to generate decoded information as indicated by signals CA9 using the error detection/correction code selected by control signals CX2. If decoder circuit 553 is unable to correct all of the errors in the encoded information indicated by signals CA6, the uncorrectable error status of signals CA6 may be logged in channel error management unit 551, the transaction is aborted, and appropriate uncorrectable error recovery actions may be initiated.

Signals CA9 are provided in parallel to second multiplexing inputs of multiplexer circuit 554. Control signal CY2 is provided to the select input of multiplexer circuit 554. Multiplexer circuit 554 provides the information indicated by signals CA6 or the decoded information indicated by signals CA9 to its outputs as indicated by signals CA7 based on control signal CY2.

In some embodiments, channel error management unit 501 generates control signals EC1, ES1, DC1, DS1, CX1, and CY1 based on signals MS1, SCK1, ST1, and SV1, and channel error management unit 551 generates control signals EC2, ES2, DC2, DS2, CX2, and CY2 based on signals MS2, SCK2, ST2, and SV2. In an embodiment, each of serializer circuits 421-422 and deserializer circuit 423 is responsive to a first clock signal. In an embodiment, each of deserializer circuits 471-472 and serializer circuit 473 is responsive to a second clock signal. Signals SCK1 and SCK2 indicate the statuses of the first and second clock signals. Signals SCK1 and SCK2 indicate when to begin encoding and decoding after changes in the first and second clock signals. The first and second clock signals may be, for example, derived from a source synchronous clock signal.

Signals ST1 and ST2 indicate a change in a temperature of controller integrated circuit 101 and/or a change in a temperature of memory integrated circuit 201. Signals ST1 and ST2 indicate when to begin encoding and decoding after a change in the temperature of one or both of integrated circuits 101 and 201. Signals SV1 and SV2 indicate a change in a supply voltage provided to interface circuit 500 and/or a change in a supply voltage provided to interface circuit 550. Signals SV1 and SV2 indicate when to begin encoding and decoding after a change in a supply voltage of one or both of interface circuits 500 and 550. Signals SCK1, ST1, and SV1 may be provided to memory integrated circuit 201 and used to generate signals SCK2, ST2, and SV2, respectively.

In some embodiments, channel error management unit 501 causes transmitting interface circuit 441A to provide encoded information indicated by signal WD5 based on signals MS1, SCK1, ST1, and SV1, and channel error management unit 551 causes receiving interface circuit 491A to decode the encoded information indicated by signal WD5 based on signals MS2, SCK2, ST2, and SV2. In these embodiments, channel error management unit 551 causes transmitting interface circuit 492A to provide encoded information indicated by signal RD5 based on signals MS2, SCK2, ST2, and SV2, and channel error management unit 501 causes receiving interface circuit 442A to decode the encoded information indicated by signal RD5 based on signals MS1, SCK1, ST1, and SV1.

According to some embodiments, channel error management unit 501 indicates to transmitting interface circuit 441A and receiving interface circuit 442A to encode and decode write and read data, respectively, for a predefined period of time, a predefined number of periods of a clock signal, or a predefined number of write and read transactions after a change in a parameter that affects the error rate of the write and read data. The change in the parameter may be, for example, a change in a clock signal as indicated by signals SCK1 and SCK2, a change in a temperature as indicated by signals ST1 and ST2, or a change in a supply voltage as indicated by signals SV1 and SV2. Channel error management unit 551 indicates to transmitting interface circuit 492A and receiving interface circuit 491A to encode and decode read and write data, respectively, for a predefined period of time, a predefined number of clock signal periods, or a predefined number of read and write transactions after the change in a parameter. The mode signals MS1 and MS2 indicate the predefined period of time, the predefined number of clock signal periods, or the predefined number of read and write transactions. The error detection/correction code used for encoding and decoding the read and write data is also indicated by signals MS1 and MS2.

In some embodiments, channel error management unit 501 causes encoder circuit 503 and multiplexer circuit 504 to provide encoded information indicated by signals CA2 based on signals MS1, SCK1, ST1, and SV1 for a predefined period of time, a predefined number of periods of a clock signal, or a predefined number of read and write transactions after a change in a parameter that affects the error rate of bits indicated by signal CA4. Channel error management unit 551 causes decoder circuit 553 and multiplexer circuit 554 to decode the encoded information indicated by signals CA6 and to provide the decoded information based on signals MS2, SCK2, ST2, and SV2. The change in the parameter may be, for example, a change in a clock signal as indicated by signals SCK1 and SCK2, a change in a temperature as indicated by signals ST1 and ST2, or a change in a supply voltage as indicated by signals SV1 and SV2.

Figure 6:
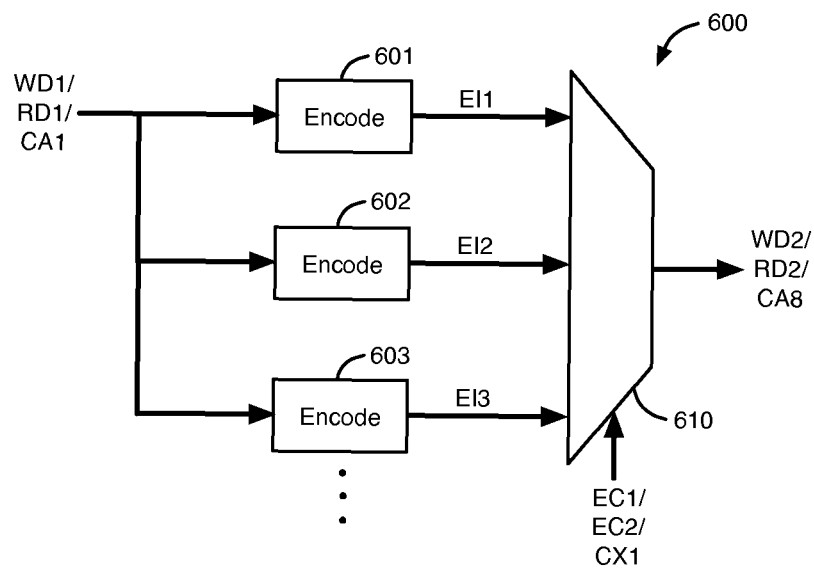
FIG. 6 illustrates an example of an encoder circuit that can be used to implement the encoder circuits shown in FIGS. 4A-4B and in FIGS. 5A-5B.

FIG. 6 illustrates an example of an encoder circuit 600 that can be used to implement encoder circuit 431 shown in FIGS. 4A and 5A, encoder circuit 482 shown in FIGS. 4B and 5B, and encoder circuit 503 shown in FIG. 5A. Encoder circuit 600 may include any number of encode units. For example, encoder circuit 600 may include three encode units 601-603, as shown in FIG. 6. Encoder circuit 600 also includes multiplexer 610. Multiplexer 610 may be implemented by a circuit or a software function.

Each of the encode units in encoder circuit 600 may be, for example, a circuit or a software algorithm that encodes input information to generate encoded information. Encode units 601, 602, and 603 encode input information to generate encoded information in parallel signals EI1, EI2, and EI3, respectively. In encoder circuit 431, the input information is the write data identified by signals WD1 for each write transaction. In encoder circuit 482, the input information is the read data identified by signals RD1 for each read transaction. In encoder circuit 503, the input information includes the address and the read or write command identified by signals CA1. The encoded information includes redundant information, as described above with respect to FIGS. 4A-4B.

In an embodiment, each of the encode units in encoder circuit 600 encodes the input information using a unique error detection/correction code relative to the other encode units in encoder circuit 600. In an embodiment, each of the encode units in encoder circuit 600 generates encoded information having a unique code rate relative to the encoded information generated by the other encode units in encoder circuit 600. The encode units in encoder circuit 600 may use any error detection/correction algorithm to generate the encoded information. Examples of error detection/correction codes that the encode units in encoder circuit 600 may use to generate encoded information include repetition codes, parity check codes, low density parity check codes, Turbo codes, Reed-Solomon codes, Bose Chaudhuri Hocquenghem (BCH) codes, cyclic redundancy check (CRC) codes, Hamming codes, convolutional codes, fountain codes, etc. These examples of error detection/correction codes are provided for the purpose of illustration and are not intended to be limiting.

In encoder circuit 431, control signals EC1 are provided to the select inputs of multiplexer 610, and multiplexer 610 provides the encoded information in one set of signals EI1, EI2, EI3, etc. to its outputs as indicated by signals WD2 based on signals EC1. Control signals EC1 determine whether multiplexer 610 provides the encoded information indicated by signals EI1, EI2, EI3, or another set of signals to signals WD2.

In encoder circuit 482, control signals EC2 are provided to the select inputs of multiplexer 610, and multiplexer 610 provides the encoded information in one set of signals EI1, EI2, EI3, etc. to its outputs as indicated by signals RD2 based on signals EC2. Control signals EC2 determine whether multiplexer 610 provides the encoded information indicated by signals EI1, EI2, EI3, or another set of signals to signals RD2.

In encoder circuit 503, control signals CX1 are provided to the select inputs of multiplexer 610, and multiplexer 610 provides the encoded information in one set of signals EI1, EI2, EI3, etc. to its outputs as indicated by signals CA8 based on signals CX1. Control signals CX1 determine whether multiplexer 610 provides the encoded information indicated by signals EI1, EI2, EI3, or another set of signals to signals CA8.

In some embodiments, system 100 may use different error detection/correction codes to encode the read data for read transactions relative to the error detection/correction codes used to encode the write data for write transactions. The encoded information generated based on the read data may have one or more different code rates than the encoded information generated based on the write data.

In some embodiments, system 100 may use different error detection/correction codes to encode information transmitted between integrated circuits 101 and 201 depending on which parameter causes the error rates of the information to increase. For example, system 100 may use a first error detection/correction code to encode the transmitted information in response to a change in a temperature, a second error detection/correction code to encode the transmitted information in response to a change in a supply voltage, and a third error detection/correction code to encode the transmitted information in response to a change in a clock signal.

In some embodiments, system 100 may use different error detection/correction codes to encode information transmitted between controller integrated circuit 101 and different memory integrated circuits. For example, system 100 may use a first error detection/correction code to encode information transmitted between controller integrated circuit 101 and memory integrated circuit 102, and a second error detection/correction code to encode information transmitted between controller integrated circuit 101 and memory integrated circuit 103.

Figure 7:
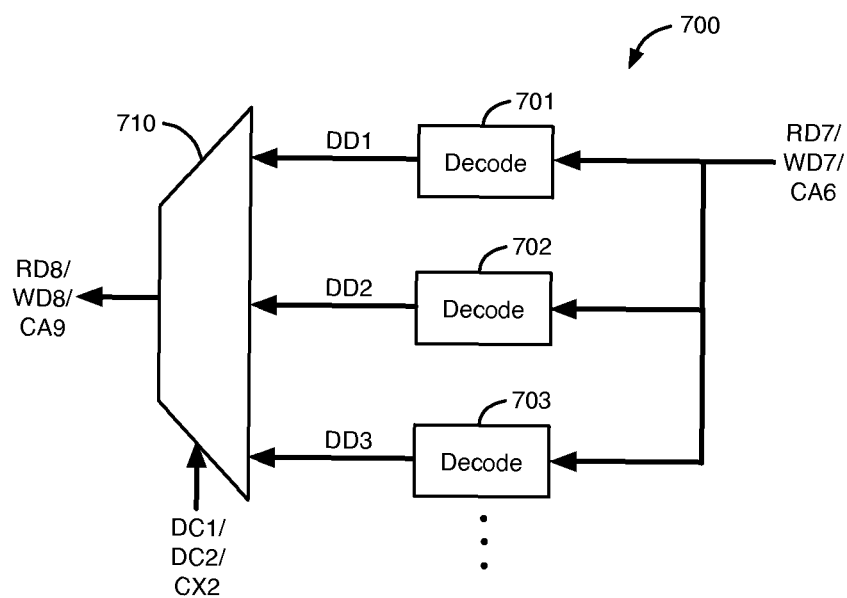
FIG. 7 illustrates an example of a decoder circuit that can be used to implement the decoder circuits shown in FIGS. 4A-4B and FIGS. 5A-5B.

FIG. 7 illustrates an example of a decoder circuit 700 that can be used to implement decoder circuit 432 shown in FIGS. 4A and 5A, decoder circuit 481 shown in FIG. 4B and 5B, and decoder circuit 553 shown in FIG. 5B. Decoder circuit 700 may include any number of decode units. For example, decoder circuit 700 may include three decode units 701-703, as shown in FIG. 7. Decoder circuit 700 also includes multiplexer 710. Multiplexer 710 may be implemented by a circuit or a software function.

Each of the decode units in decoder circuit 700 may be, for example, a circuit or a software algorithm that decodes encoded information to generate decoded information. Decode units 701, 702, and 703 decode encoded information to generate decoded information in parallel signals DD1, DD2, and DD3, respectively. In decoder circuit 432, the encoded information is indicated by signals RD7 for a read transaction, and the decoded information is the decoded read data indicated by signals RD8. In decoder circuit 481, the encoded information is indicated by signals WD7 for a write transaction, and the decoded information is the decoded write data indicated by signals WD8. In decoder circuit 553, the encoded information is indicated by signals CA6, and the decoded information is the decoded address and read or write command indicated by signals CA9. Each of the decode units in decoder circuit 700 decodes the encoded information based on the error detection/correction code that was used to generate the encoded information.

In decoder circuit 432, control signals DC1 are provided to the select inputs of multiplexer 710. Multiplexer 710 provides the decoded read data in one set of signals DD1, DD2, DD3, etc. to its outputs as indicated by signals RD8 based on signals DC1. Control signals DC1 determine whether multiplexer 710 provides the decoded read data indicated by signals DD1, DD2, DD3, or another set of signals to signals RD8.

In decoder circuit 481, control signals DC2 are provided to the select inputs of multiplexer 710. Multiplexer 710 provides the decoded write data in one set of signals DD1, DD2, DD3, etc. to its outputs as indicated by signals WD8 based on signals DC2. Control signals DC2 determine whether multiplexer 710 provides the decoded write data indicated by signals DD1, DD2, DD3, or another set of signals to signals WD8.

In decoder circuit 553, control signals CX2 are provided to the select inputs of multiplexer 710. Multiplexer 710 provides the decoded information in one set of signals DD1, DD2, DD3, etc. to its outputs as indicated by signals CA9 based on signals CX2. Control signals CX2 determine whether multiplexer 710 provides the decoded information indicated by signals DD1, DD2, DD3, or another set of signals to signals CA9.

According to an embodiment, interface circuits 212-213 encode information transmitted for read and write transactions during first and second periods of time after a change in a parameter that affects error rates of the transmitted information. During the first period of time, encoder circuits 431, 482, and/or 503 encode information for the read and write transactions using a first error detection/correction code in respective ones of encode units 601 to generate encoded information having a first code rate. Decoder circuits 432, 481, and/or 553 decode the encoded information received during the first period of time based on the first error detection/correction code in respective ones of decode units 701. During the second period of time after the first period of time, encoder circuits 431, 482, and/or 503 encode information for read and write transactions using a second error detection/correction code in respective ones of encode units 602 to generate encoded information having a second code rate. The second code rate is larger than the first code rate. Decoder circuits 432, 481, and/or 553 decode the encoded information received during the second period of time based on the second error detection/correction code in respective ones of decode units 702.

Figure 8:
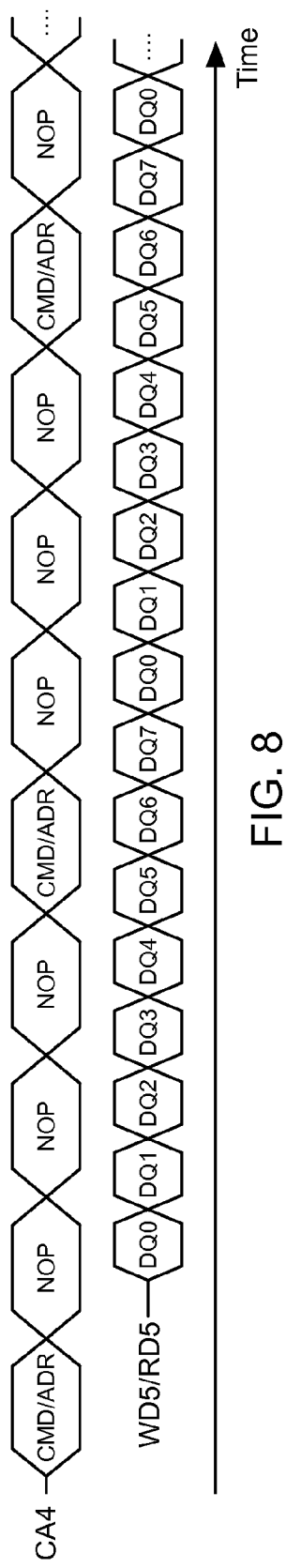
FIG. 8 illustrates examples of waveforms of signals transmitted between the controller integrated circuit and the memory integrated circuit of FIG. 2.

FIG. 8 illustrates an example of a waveform of signal CA4 and an example of a waveform of one of signals WD5 or one of signals RD5. System 100 generates the exemplary waveforms shown in FIG. 8 without encoded information in the signal WD5 or RD5. The waveforms shown in FIG. 8 are generated when the error rate of bits indicated by the signal WD5 or RD5 is low enough such that redundant error correction or detection information is not provided with the signal WD5 or RD5. As an example, the waveforms shown in FIG. 8 may be generated after time T3 in FIG. 3. During each of the periods of time indicated as CMD/ADR in FIG. 8, the waveform of signal CA4 indicates an address and a read or write command for a read or write transaction, respectively.

The waveform of signal CA4 shown in FIG. 8 indicates an idle (or no operation, NOP) time in between each address and read or write command. The NOP time accommodates for the pipeline latency of processing successive read or write transactions, and equalizes the command/data bandwidth. The NOP time in signal CA4 is indicated as NOP in FIG. 8. The waveform of the signal WD5 or RD5 includes eight data bits in each read or write transaction. The eight data bits in each read or write transaction are indicated as DQ0-DQ7 in FIG. 8. The code rate of the signal WD5 or RD5 is 1/1 (i.e., unity) in FIG. 8.

Figure 9:
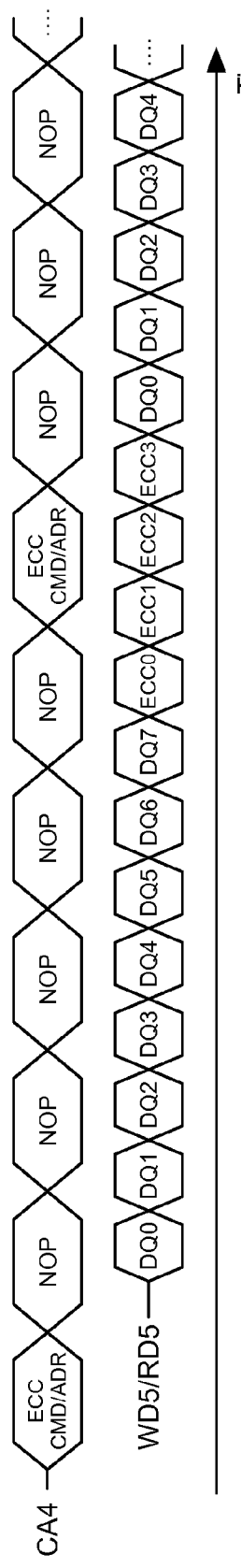
FIG. 9 illustrates examples of waveforms of signals transmitted between the controller integrated circuit and the memory integrated circuit of FIG. 2 that include channel error control commands and error control information.

FIG. 9 illustrates an example of a waveform of signal CA4 that indicates error control commands and an example of a waveform of one of signals WD5 or one of signals RD5 that includes redundant error correction information. In FIG. 9, the waveform of the signal WD5 or RD5 includes eight data bits DQ0-DQ7 and four redundant error correction bits ECC0-ECC3 in each command. The code rate of the bits indicated by the signal WD5 or RD5 is ⅔ in FIG. 9.

Figure 10:
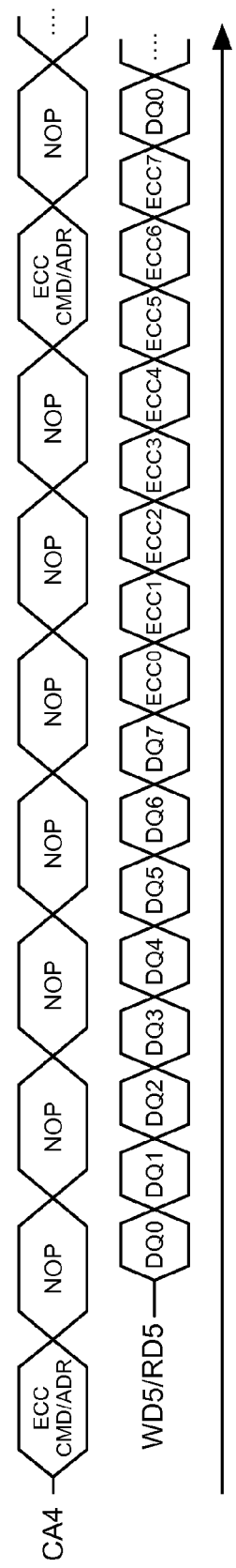
FIG. 10 illustrates additional examples of waveforms of signals transmitted between the controller integrated circuit and the memory integrated circuit of FIG. 2 that include channel error control commands and error control information.

FIG. 10 illustrates another example of a waveform of signal CA4 that indicates error control commands and another example of a waveform of one of signals WD5 or one of signals RD5 that includes redundant error correction information. In FIG. 10, the waveform of the signal WD5 or RD5 includes eight data bits DQ0-DQ7 and eight redundant error correction bits ECC0-ECC7 in each command. The code rate of the bits indicated by the signal WD5 or RD5 is ½ in FIG. 10. The waveforms shown in each of FIGS. 9 and 10 may, for example, be generated between times T2 and T3 in FIG. 3.

The exemplary waveforms shown in FIGS. 9-10 are generated by interface circuits 400 and 450 in the embodiment of FIGS. 4A-4B. During each of the periods of time indicated as ECC CMD/ADR in FIGS. 9-10, the waveform of signal CA4 indicates an address, an error control command, and a read or write command for a read or write transaction, respectively, as described above with respect to FIG. 4A. The waveform of signal CA4 indicates idle (NOP) times in between an address, an error control command, and a read or write command for each read or write transaction, respectively. The idle times in signal CA4 are indicated by NOP in FIGS. 9-10. The idle times identified as NOP are added to signal CA4 to provide extra latency between each read or write transaction to provide the redundant error correction information with the read or write data.

According to an embodiment, system 100 generates the waveforms shown in FIG. 10 for signals CA4, RD5, and WD5 during a first period of time after a change in a parameter causes the error rates of the read data and the write data indicated by signals RD5 and WD5, respectively, to increase. System 100 generates the waveforms shown in FIG. 9 for signals CA4, RD5, and WD5 during a second period of time after the first period of time. During the second period of time, the error rates in the read data and the write data indicated by signals RD5 and WD5, respectively, have decreased relative to the error rates in the read and write data during the first period of time. However, the error rates of the read data and the write data indicated by signals RD5 and WD5, respectively, are still large enough such that redundant information is provided with the read and write data during the second period of time. System 100 generates the waveforms shown in FIG. 8 for signals CA4, RD5, and WD5 during a third period of time after the second period of time. The error rates of the read and write data indicated by signals RD5 and WD5, respectively, are small enough such that additional redundant information is not provided with the read and write data during the third period of time.

The foregoing description of the exemplary embodiments has been presented for the purposes of illustration and description. The foregoing description is not intended to be exhaustive or limiting to the examples disclosed herein. In some instances, certain features of the embodiments can be employed without a corresponding use of other features as set forth. Many modifications, substitutions, and variations are possible in light of the above teachings, without departing from the scope of the claims.

What is claimed is:

1. An integrated circuit device comprising:
    a first output buffer circuit to provide, to external conductors connected to a second integrated circuit, a first output having a first code rate, wherein the first output is provided after the first output buffer has exited a low power mode and before a locked loop circuit that generates a clock signal used by the first output buffer circuit to serialize the first output has achieved a locked condition, and wherein the first output comprises first redundant information,
    the first output buffer circuit to provide, to the external conductors connected to the second integrated circuit, a second output having a second code rate, wherein the second output is provided after the locked loop circuit has achieved a locked condition, and wherein the second code rate of the second output is different than the first code rate.

2. The integrated circuit device of claim 1, further comprising:
    a memory array circuit, wherein the first output comprises encoded information generated by encoding first read data retrieved from the memory array circuit during a first read transaction, the first read data not including the first redundant information, and wherein the second output comprises second read data retrieved from the memory array circuit during a second read transaction.

3. The integrated circuit device of claim 1, wherein the first output comprises encoded information generated by encoding first write data to store in a memory array circuit during a first write transaction, and wherein the second output comprises second write data to store in the memory array circuit during a second write transaction.

4. The integrated circuit device of claim 1, wherein the first output comprises encoded information generated by encoding a first address and a first command for a first transaction to access a memory array circuit, and wherein the second output comprises a second address and a second command for a second transaction to access the memory array circuit.

5. The integrated circuit device of claim 1, wherein the second output comprises second redundant information, the first output buffer circuit to provide the second redundant information, and wherein the second code rate of the second output is greater than the first code rate of the first output.

6. The integrated circuit device of claim 1, wherein the second output comprises second redundant information, the first output buffer circuit to provide the second redundant information, and wherein the second code rate of the second output is less than the first code rate of the first output.

7. The integrated circuit device of claim 1, further comprising:
    an encoder circuit to generate the first redundant information based on a first input using a first error detection code in response to a first indication of a change in a parameter, the parameter being associated with an operating condition provided to the first output buffer circuit that affects an error rate for the transmission of the first output between the integrated circuit and the second integrated circuit.

8. The integrated circuit device of claim 7, wherein the second output comprises second redundant information, the encoder circuit to generate the second redundant information based on a second input using a second error detection code in response to a second indication of the second output having an error rate for the transmission of second output between the integrated circuit and the second integrated circuit that is different than the error rate of the first output for the transmission of the first output between the integrated circuit and the second integrated circuit, and wherein the second error detection code is different than the first error detection code.

9. The integrated circuit device of claim 1, wherein the second output comprises second redundant information, the first output buffer circuit to provide a third output, wherein the third output is provided in response to a third indication of the third output having an error rate for the transmission of the third output between the integrated circuit and the second integrated circuit that is less than the error rate of the second output for the transmission of the second output between the integrated circuit and the second integrated circuit, and wherein the third output has a third code rate that is greater than the first and the second code rates.

10. The integrated circuit device of claim 1 further comprising:
    a channel error management circuit to generate the first indication based on a first error control command indicating the first code rate of the first output and the second indication based on a second error control command indicating the second code rate of the second output; and
    a second output buffer circuit to provide the first error control command and the second error control command.

11. The integrated circuit device of claim 1 further comprising:
    a storage circuit to store an error control command; and
    a channel error management circuit to generate the first indication and the second indication based on the error control command stored in the storage circuit.

12. The integrated circuit device of claim 1 further comprising:
    a first multiplexer circuit to provide a first selection in response to the first indication and to provide a second selection in response to the second indication, wherein the first selection comprises the first redundant information, wherein the first output identifies the first selection, and wherein the second output identifies the second selection.

13. A method comprising:

providing, to external conductors connected to an integrated circuit, a first output having a first code rate using a first output buffer circuit, wherein the first output is provided after the first output buffer has exited a low power mode and before a locked loop circuit that generates a clock signal used by the first output buffer circuit to serialize the first output has achieved a locked condition, wherein the first output comprises first redundant information; and providing, to the external conductors connected to the integrated circuit, a second output having a second code rate using the first output buffer circuit, wherein the second output is provided after the locked loop circuit has achieved a locked condition, and wherein the second code rate of the second output is different than the first code rate of the first output.

14. The method of claim 13 further comprising:

encoding first read data retrieved from a memory array circuit during a first read transaction to generate encoded information, wherein the first output buffer circuit generates the first output based on the encoded information, and wherein the first read data does not include the encoded information, and wherein the first output buffer circuit generates the second output based on second read data retrieved from the memory array circuit during a second read transaction.

15. The method of claim 13 further comprising:

encoding first write data to store in a memory array circuit during a first write transaction to generate encoded information, wherein the first output buffer circuit generates the first output based on the encoded information and the first write data does not include the encoded information, and wherein the first output buffer circuit generates the second output based on second write data to store in the memory array circuit during a second write transaction.

16. The method of claim 13 further comprising:

encoding a first address and a first command for a first transaction to access a memory array circuit to generate encoded information, wherein the first output buffer circuit generates the first output based on the encoded information and the first address and the first command do not include the encoded information, and wherein the first output buffer circuit generates the second output based on a second address and a second command for a second transaction to access the memory array circuit.

17. The method of claim 13 further comprising:

encoding a first input using a first error detection and correction code to generate the first redundant information, wherein the first input does not include the first redundant information; and encoding a second input using a second error detection and correction code to generate second redundant information, wherein the second output comprises the second redundant information, and wherein the first output buffer circuit provides the second redundant information in the second output, wherein the second input does not include the second redundant information.

18. The method of claim 13, wherein the first output is provided in response to a first indication of a change in a parameter, the parameter being associated with an operating condition provided to the first output buffer circuit that affects an error rate for the transmission of the first output between the integrated circuit and the second integrated circuit, and wherein the operating condition provided to the first output buffer circuit is at least one of a temperature, a supply voltage, a duty cycle of the clock signal, and a frequency of the clock signal.

19. The method of claim 18 further comprising:

generating the first indication based on a first error control command indicating the first code rate of the first output;

providing the first error control command using a second output buffer circuit;

generating a second indication of the second output having an error rate for the transmission of the second output between the integrated circuit and the second integrated circuit that is different than the error rate of the first output for the transmission of the first output between the integrated circuit and the second integrated circuit, the second indication also based on a second error control command indicating the second code rate of the second output; and providing the second error control command using the second output buffer circuit.

20. The method of claim 18 further comprising:

storing an error control command in a storage circuit;

generating the first indication based on the error control command stored in the storage circuit; and generating a second indication of the second output having an error rate for the transmission of the second output between the integrated circuit and the second integrated circuit that is different than the error rate of the first output for the transmission of the first output between the integrated circuit and the second integrated circuit, the second indication also being based on the error control command stored in the storage circuit.

* * * * *